(12) United States Patent
Spicer et al.

(10) Patent No.: US 7,318,721 B2
(45) Date of Patent: Jan. 15, 2008

(54) MOLDING-SYSTEM PLATEN

(75) Inventors: Kevin Allan Spicer, Bolton (CA); Peter Adrian Looije, Newmarket (CA)

(73) Assignee: Husky Injection Molding Systems Ltd., Bolton, Ontario (CA)

( * ) Notice: Subject to any disclaimer, the term of this patent is extended or adjusted under 35 U.S.C. 154(b) by 160 days.

(21) Appl. No.: 11/392,794

(22) Filed: Mar. 30, 2006

(65) Prior Publication Data

US 2007/0235898 A1 Oct. 11, 2007

(51) Int. Cl.
*B29C 45/17* (2006.01)

(52) U.S. Cl. .................. 425/472; 29/592; 100/295; 425/595

(58) Field of Classification Search ............... 425/595, 425/451.9, 472; 100/295; 156/580; 29/592
See application file for complete search history.

(56) References Cited

U.S. PATENT DOCUMENTS

| | | | |
|---|---|---|---|
| 5,593,711 A | 1/1997 | Glaesener | |
| 5,776,402 A | 7/1998 | Glaesener | |
| 6,027,329 A * | 2/2000 | Nazarian et al. | 425/451.9 |
| 6,171,097 B1 * | 1/2001 | Urbanek | 425/595 |
| 6,439,876 B1 | 8/2002 | Glaesener | |
| 7,048,535 B2 * | 5/2006 | Takanohashi | 425/472 |
| 7,080,978 B2 * | 7/2006 | Glaesener | 425/472 |
| 2004/0208950 A1 | 10/2004 | Glaesener | |

FOREIGN PATENT DOCUMENTS

| | | |
|---|---|---|
| WO | WO 98/41380 A1 | 9/1998 |
| WO | WO 03/084731 A1 | 10/2003 |
| WO | WO 2005/084909 A1 | 9/2005 |

* cited by examiner

*Primary Examiner*—James Mackey

(57) ABSTRACT

Disclosed are molding-system platens, molding systems that include the molding-system platens, and a method of a molding-system platen.

33 Claims, 10 Drawing Sheets

MOLDING-SYSTEM PLATEN

TECHNICAL FIELD

The present invention generally relates to, but is not limited to, molding systems, and more specifically the present invention relates to, but is not limited to, molding-system platens and/or molding systems having molding-system platens.

BACKGROUND

U.S. Pat. No. 5,593,711 (Inventor: Pierre Glaesener; Publication Date: 1997 Jan. 14; Assignee: Husky Injection Molding Systems Limited, Canada) discloses a platen for transmitting a clamping force while preventing end face bending by using an intermediate structure distributing forces from the edges of one end face to the centre of the other end face.

U.S. Pat. No. 5,776,402 (Inventor: Pierre Glaesener; Publication Date: 1998 Jul. 7; Assignee: Husky Injection Molding Systems Limited, Canada) discloses a process of distributing forces within a platen by generating force against sidewall(s) in first direction and directing force from one of the sidewalls solely towards the other of the sidewalls.

PCT Patent Number WO 03/084731A1 (Inventor: Wohlrab et al; Publication Date: 2003 Oct. 16; Assignee: Krauss-Maffei Kunststofftechnik GMBH, Germany) discloses a platen for an injection-molding machine. The platen includes a backing frame joined to a front plate by angled ribs that meet the frame outside the tie bar holes.

U.S. Patent Application Number 2004/0208950A1 (Inventor: Pierre Glaesener; Publication Date: 2004 Oct. 21; Assignee: Husky Injection Molding Systems Limited, Canada) discloses a platen for a molding machine. The platen includes a support located between two planar walls having ribs arranged at non-normal angle to a first wall and the rib transmits forces from the first wall to a second wall such that bending of the second wall is resisted.

U.S. Pat. No. 6,439,876 (Inventor: Pierre Glaesener; Publication Date: 2002 Aug. 27; Assignee: Husky Injection Molding Systems Limited, Canada) discloses a mold-support platen that includes spaced-apart ribs interconnecting back face, wall and front face.

PCT Patent Application Number WO 2005/084909 A1 (Inventor: Nagata, Yoshihiko; Publication Date: 15 Sep. 2005; Assignee: Sumitomo Heavy Industries, Japan) discloses a mold support device of a molding system. Apparently, this patent application discloses (with reference to paragraph 0053) that the central parts of four peripheral edges (portions) linked by vertical-border linking members and horizontal-border linking members of mold-mounting part and rear-surface part are separated from tie-bar load-bearing parts. As a result, even if parts in the vicinity of tie-bar load-bearing parts (that is, tie-bar ears) in rear surface should deform as a result of reaction force said tie-bar load-bearing parts receive from tie-bars, said deformation is not transmitted to mold-mounting part, and said mould mounting part does not deform.

FIGS. 1A to 1D are views of molding-system platens 100, 200 in accordance with U.S. Pat. Nos. 5,593,711 and 5,776,402. FIG. 1A is a perspective view of the molding-system platen 100 (hereafter referred to as the "platen" 100) for use in a molding system (not depicted) such as an injection molding system. The platen 100 includes a mold-bearing zone 102 and a force-bearing zone 110. The mold-bearing zone 102 includes a central portion 104 and also includes a peripheral portion 106, and the peripheral portion 106 surrounds the central portion 104. The central portion 104 is coupled to the force-bearing zone 110 while the peripheral portion 106 is decoupled from the force-bearing zone 110. Zone 110 includes tie-bar ears 115 at each corner of the zone 100. The tie-bar ears 115 receive tie bars (not depicted) that transmit a clamping force to the platen 100.

A potential problem with this arrangement is that the tie-bar ears 115 may inadvertently bend or warp responsive to a clamping force being applied to the tie-bar ears 115 via the tie bars (not depicted). However, the tie bar ears 115 may resist deflection if the zone 110 includes a sufficient amount of mass around the tie-bar ears 115 but then this would increase the weight of the platen 100 (and the cost of the platen 100 would increase), and then (if the platen 100 is used as a movable platen) the cycle time of the molding system may increase (which may be not acceptable in some cases). If the platen 100 is used as a movable platen, the issue would be that by inadvertently increasing the weight of the platen 100, the platen 100 would have a larger inertia and therefore the platen 100 would require more time and energy to move in order to keep the cycle time (of the molding system) low.

A mold 160 (depicted in FIG. 1B) is attachable to and detachable from the central portion 104 of the mold-bearing zone 102. The peripheral portion 106 of the mold-bearing zone 102 defines tie-bar passageways 101 that are positioned at the peripherally-located corners of the mold-bearing zone 102. The tie-bar passageways 101 are sized to receive and to permit tie bars 166 (depicted in FIG. 1B) to extend past the mold-bearing zone 102 and toward the force-bearing zone 110. The tie bars 166 are usually coupled to the peripheral corners of the force-bearing zone 110. If the platen 100 is used as a stationary platen, the mold-bearing zone 102 also defines a machine-nozzle passageway 103 sized to permit a molding-system nozzle 164 (depicted in FIG. 1B) to pass through and communicate with a mold cavity 174 (depicted in FIG. 1B) that is defined by the mold 160. If the platen 100 is used as a movable platen, the mold-bearing zone 102 does not define the passageway 103.

A force-transferring structure 162 symmetrically couples the central portion 104 of the mold-bearing zone 102 to the peripheral (upper and lower) edges of the force-bearing zone 110. A force (such as a clamping force and/or a mold-break force) is applied by the tie bars 166 to the peripheral corners of the force-bearing zone 110 and then the force is subsequently symmetrically coupled through the force-transferring structure 162 over to the central portion 104 of the mold-bearing zone 102. In this example, some of the force may be coupled to the peripheral portion 106. In effect, the force is symmetrically focused onto the mold 160 that is attached to the central portion 104. In this manner, the force is more efficiently used in the clamping and mold-break operations associated with the mold 160. The force-transferring structure 162 may be, for example, a hollowed semicircular-shaped body or a quonset-shaped body. While this arrangement focuses the force to the mold 160 (via the central portion 104), it also helps to maintain the mold-bearing zone 102 substantially flat, to prevent bending of the peripheral portion 106 and also to prevent bending of the central portion 104. A benefit of maintaining the mold-bearing zone 102 flat is that the force is applied substantially evenly to the mold 160 so that the mold 160 does not become exposed to unevenly applied forces. In effect, the mold 160 is prevented from becoming worn down by unevenly-applied forces, and so this arrangement may extend the useful life of the mold 160.

FIG. 1B is a cross-sectional view of the platen 100 taken along line B-B of FIG. 1A, in which a force has not yet been applied to the force-bearing zone 110, and the mold-bearing zone 102 is shown in a substantially flat condition. The mold 160 includes a mold half 170 and a mold half 172. The mold half 172 is shown attached to the central portion 104 of the mold-bearing zone 102. The mold half 170 is attached to another platen which is not depicted. Actuators (not depicted) have been actuated to stroke the platens that are attached to the mold halves 170, 172 so that the mold halves 170, 172 close or shut against each other to define a mold cavity 174. A molding-system nozzle 164 passes through the passageway 103 and a passageway 165 defined by the force-bearing zone 110. The nozzle 164 is positioned to communicate a molding material into the mold cavity 174.

If the platen 100 is used as a movable platen, the passageway 165 is not used. According to a variation, items 167 are tie-bar nuts that are used to attach the tie bars 166 to the peripheral corners of the force-bearing zone 110 so that the tie bars 166 may be used to transfer a clamping force and/or a mold-break force to the force-bearing zone 110. According to another variation, items 167 are clamping mechanisms that are used to apply the clamping force and/or the mold-break force to the tie bars 166 and to the force-bearing zone 110 (and items 167 may reside within the zone 110 or outside of the zone 110).

FIG. 1C is a cross-sectional view of the platen 100 taken along line B-B of FIG. 1A, in which a force 179 is shown applied to the force-bearing zone 110, and the mold-bearing zone 102 is shown maintained in a substantially flat condition under the application of the force 179. The peripheral corners of the force-bearing zone 110 receive the force 179, and then the force-transmitting structure 162 transmits a substantial portion 180 of the force 179 over to the central portion 104. However, none of the force 179 is coupled from the force-bearing zone 110 over to the peripheral portion 106 (because the portion 106 is decoupled from the zone 110). Advantageously (under this arrangement), the central portion 104 and the peripheral portion 106 do not experience warping or bending so that the life of the mold 160 may be prolonged. Disadvantageously, the force 179 inadvertently acts to bend or to warp (as indicated by arrow 182) the peripheral corners of the force-bearing zone 110 and/or the tie bars 166. The warping action associated with the portion 182 of the force 179 may cause premature and/or inadvertent wear and tear to the tie bars 166 and/or to the items 167 thus prematurely shortening their useful life. The tie-bar ears 115 may inadvertently bend if the force 179 is too large.

FIG. 1D is a perspective view of the molding-system platen 200 (hereafter referred to as the "platen" 200) which operates according to the principles of the platen 100 of FIG. 1A (but with some variations). To facilitate an understanding of the platen 200, elements that are similar to those of the platen 100 are identified by reference numerals that use a two-hundred designation rather than a one-hundred designation. For example, the mold-bearing zone of the platen 200 is labeled 202 rather than being labeled 102 (etc). The mold-bearing zone 202 no longer defines tie bar passageways. The force-bearing zone 210 defines tie-bar ears 215 (located at the four corners of the zone 210). The zone 202 now defines notches 290 that surround the tie bars at least in part. The force-transferring structure 262 is shown as a frustum-shaped body or as a frusto-conical body so that in effect the force 279 may be symmetrically applied substantially across the corners of the central portion 204. A frustum is the part of a solid (such as a cone, a pyramid, etc) between two parallel planes cutting the solid, especially the section between the base and a plane parallel to the base. The pinnacle of the frustum-shaped body is attached to the mold-bearing zone 202 and the base of the frustum-shaped body is attached to the force-bearing zone 210.

FIGS. 2A to 2D are views of molding-system platens 300, 400, 500 in accordance with U.S. Patent Application Number 2004/0208950A1. FIG. 2A is a perspective view of the molding-system platen 300 (hereafter referred to as the "platen" 300). The platen 300 is similar in some aspects to the platens 100, 200 in that the platen 300 includes a mold-bearing zone 302 and a force-bearing zone 310. The mold-bearing zone 302 includes a central portion 304 and a peripheral portion 306 that surrounds the central portion 304. The force-transferring structure 362 couples the force-bearing zone 310 to the central portion 304. However, in sharp contrast to the platens 100, 200, the platen 300 includes a plurality of ribs 311 that are placed offset from each other, that have a length and that couples the force-bearing zone 310 to the peripheral portion 306 (in sharp contrast to the platens 100, 200 in which the force-bearing zones 110, 210 are decoupled from the peripheral portion 106, 206). The ribs 311 are coupled to a force-transferring structure 362 as well. The zone 310 includes tie-bar ears at each corner of the zone 310.

A potential problem with the platen 300 is that even though the tie-bar ears 315 may be prevented from becoming deflected (that is, suppressed deflection of the tie-bar ears 315), with higher amounts of clamping force, the zone 302 may experience deflection (warping) of such a magnitude that the deflection may prevent the use of molds having larger foot prints, and may be even high enough to bend the tie bars as well. But the zone 302 could be prevented from deflecting by using a lower clamping force (unfortunately) or by increasing the mass of the zone 302 (which may inadvertently increase the cost), and if the platen 300 were used as a movable platen, then the cycle time would increase because a heavier platen has a larger inertia and therefore the heavier platen would require more time and energy to move in order to keep the cycle time—of the molding system—low.

FIG. 2B is a cross-sectional view of the platen 300 along the line BB of FIG. 2A, in which a force has not yet been applied to the force-bearing zone 310, and the mold-bearing zone 302 is flat under the state of un-applied force. The ribs 311 couple the force-bearing zone 310 to the peripheral portion 306 as well as to the force-transferring structure 362 (so that, in effect, the peripheral portion 306 is coupled to the force-bearing zone 310).

FIG. 2C is a cross-sectional view of the platen 300 taken along the line B-B of FIG. 2A, in which a force 379 is applied to the force-bearing zone 310. A portion 380 of the force 379 is transmitted from the force-bearing zone 310 via the force-transferring structure 362 to the central portion 304. However, a smaller portion 384 of the force 379 is transmitted from the force-bearing zone 310 via the ribs 311 to the portion 306, and as a result the peripheral portion 306 of the mold-bearing zone 302 becomes warped or bent while the force-bearing zone 310 remains substantially flat. Under this arrangement, in effect, the tie bars 366 and or the items 367 do not become prematurely worn down due to stresses (in sharp contrast to the tie bars 166 and the items 167 of FIG. 1B) due to the force-bearing zone 310 not bending or warping under the application of the force 379 (in sharp contrast to bending of the zone 110 of FIG. 1C). However, disadvantageously, the peripheral portion 306 experiences warping or bending due to the portion 384 of the force 379 that is transmitted from the force-bearing zone 310 to the peripheral portion 306 (in sharp contrast to the peripheral portion 106 of FIG. 1C that does not receive any force when the force 179 is applied). The arrangement of the ribs 311 may cause premature wear of the mold 360 if the footprint of the mold 360 extends into the warped peripheral portion 306. In sharp contrast, the mold 160 of FIG. 1C does not experience premature wear because the peripheral portion 106 does not experience inadvertent warping due to the applied force 179.

FIG. 2D is a perspective view of the molding-system platens 400, 500 which operate according to the principles of the platen 200 of FIG. 2A. Hereafter, the molding-system platens 400, 500 will be referred to as the "platens" 400, 500. To facilitate an understanding of the platens 400, 500 elements that are similar to those of the platen 300 are identified by reference numerals that use a four-hundred designation and five-hundred designation (respectively) rather than a three-hundred designation. For example, the mold-bearing zone of the platen 400 is labeled 402 rather than being labeled 302, while the mold-bearing zone of the platen 500 is labeled 502 rather than being labeled 302 (etc). The platen 400 is depicted as a stationary platen while the platen 500 is depicted as a movable platen.

The mold-bearing zones 402, 502 no longer define tie bar passageways. The force-bearing zones 410, 510 define tie-bar ears 415, 515 respectively. The mold-bearing zones 402, 502 now define notches 490, 590 that surround tie bars at least in part. The ribs 411, 511 are positioned symmetrically around the peripheral edge (portion) of the central portions 404, 504 respectively. The ribs 411 are aligned perpendicularly between the zones 402, 410 while the ribs 511 are aligned non-perpendicularly (angled) between the zones 502, 510. The force-transferring structures 462, 562 are shown as frustum-shaped bodies or as frusto-conical shaped bodies so that so that in effect the applied force may be symmetrically applied substantially across the corners of the central portions 404, 504. The pinnacle of the frustum-shaped body is attached to the mold-bearing zone 402, 502 and the base of the frustum-shaped body is attached to the force-bearing zone 410, 510 respectively. Each corner of the zone 410, 510 includes tie-bar ears 415, 515 respectively.

It appears the arrangements of the platens 100, 200, 300, 400 and 500 have shortcomings associated therewith.

SUMMARY

According to a first aspect of the present invention, there is provided a molding-system platen, including a mold-bearing zone having a central portion surrounded by a peripheral portion, and the molding system platen also including a force-bearing zone having a mid-section surrounded by an edge, and also having a reaction-receiving part, the mid-section linking to the central portion, the edge linking to and stiffening the peripheral portion, and the peripheral portion linking to and stiffening the reaction-receiving part.

According to a second aspect of the present invention, there is provided a molding system, including a molding-system platen, the molding-system platen including a mold-bearing zone having a central portion surrounded by a peripheral portion, and the molding system platen also including a force-bearing zone having a mid-section surrounded by an edge, and also having a reaction-receiving part, the mid-section linking to the central portion, the edge linking to and stiffening the peripheral portion, and the peripheral portion linking to and stiffening the reaction-receiving part.

According to a third aspect of the present invention, there is provided a method, including linking a mid-section of a force-bearing zone to a central portion of a mold-bearing zone, the mold-bearing zone and the force-bearing zone included in a molding-system platen, the method also including stiffening a peripheral portion surrounding the central portion by linking an edge surrounding the mid-section to the peripheral portion, and the method also including stiffening a reaction-receiving part of the force-bearing zone by linking the peripheral portion to the reaction-receiving part.

A technical effect of the present invention is to mitigate the disadvantages associated with known molding-system platens (at least in part) and improve aspects of platen operation of a molding system as will become apparent in view of the description of the exemplary embodiments provided below.

BRIEF DESCRIPTION OF THE DRAWINGS

A better understanding of the exemplary embodiments of the present invention (including alternatives and/or variations thereof) may be obtained with reference to the detailed description of the exemplary embodiments along with the following drawings, in which.

The drawings are not necessarily to scale and are sometimes illustrated by phantom lines, diagrammatic representations and fragmentary views. In certain instances, details that are not necessary for an understanding of the embodiments or that render other details difficult to perceive may have been omitted.

DETAILED DESCRIPTION OF THE
EXEMPLARY EMBODIMENTS

FIGS. 3A to 3F are views of molding-system platens 600, 700, 800, 900, 1000 according to the first, second, third (which is the preferred embodiment or best mode), fourth and fifth exemplary embodiments respectively.

Figure 3A:
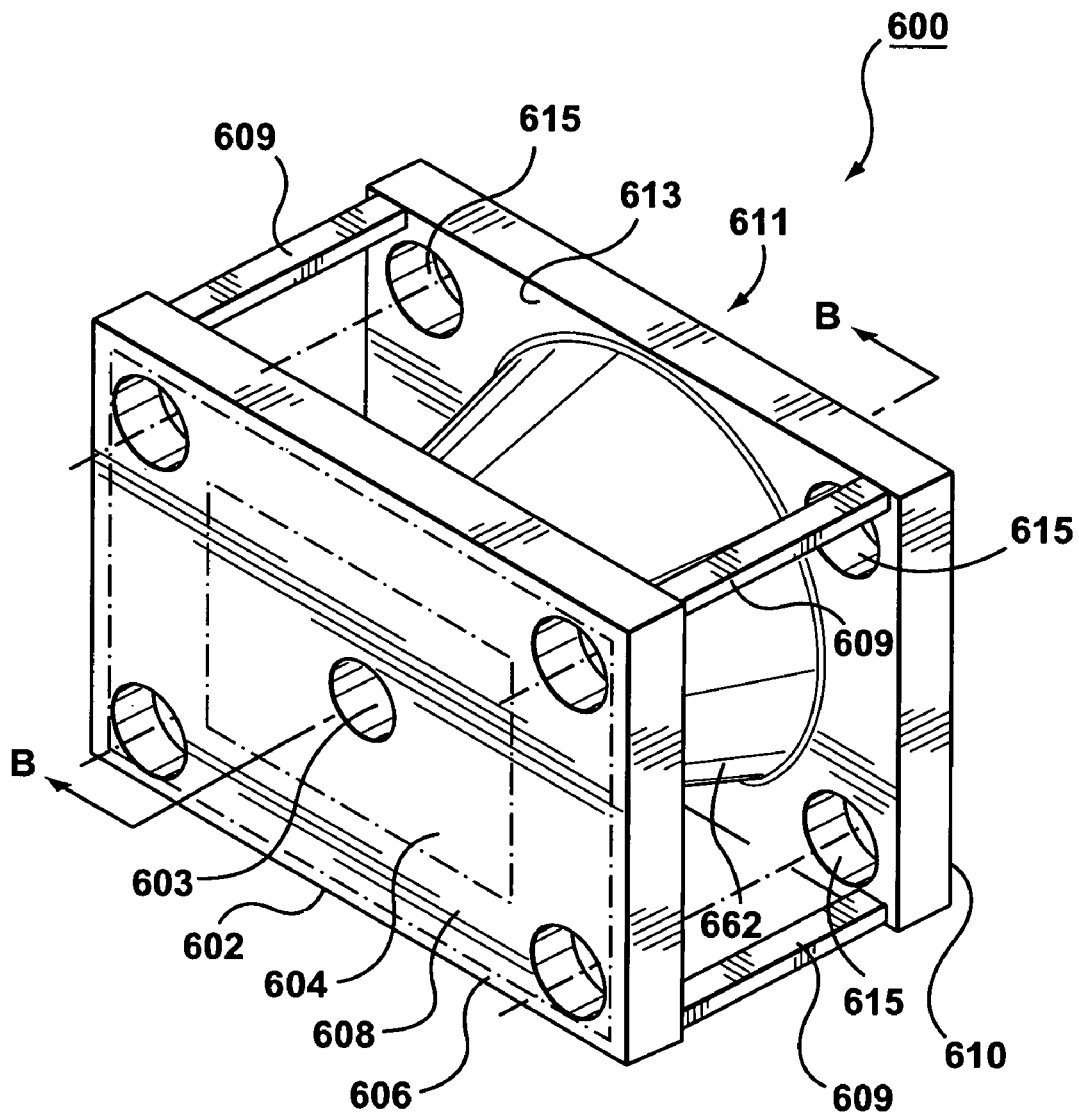
FIGS. 3A to 3F are the views of molding-system platens according to the exemplary embodiments.

FIG. 3A is a perspective view of the molding-system platen 600 (hereafter referred to as the "platen" 600). The platen 600 may be sold separately or the platen 600 may be sold along (or included) with a molding system (not depicted) such as the Quadloc™ molding system or the Hylectric™ molding system manufactured by Husky Injection Molding Systems Limited of Canada.

The platen 600 includes a mold-bearing zone 602 that has a central portion 604, and the central portion 604 is surrounded by a peripheral portion 606. The platen 600 also includes a force-bearing zone 610 that has a mid-section 611. The mid-section 611 is surrounded by an edge 613. The force-bearing zone 610 also has a reaction-receiving part 615. The mid-section 611 links to the central portion 604. The edge 613 links to and stiffens the peripheral portion 606. The peripheral portion 606 links to and stiffens the reaction-receiving part 615.

For example, the reaction-receiving part 615 includes tie-bar ears 615 that are positioned at corners of the force-bearing zone 610.

According to a variant, the platen 600 is used in a toggle-clamp arrangement (that are typically used in an all-electric molding system) in which toggle components are used to transmit a clamping force to the platen 600 via the reaction-receiving part 615. The toggle-clamp arrangements are known in the art and therefore a description of the toggle-clamp arrangements will not be described here. However, for the sake of simplifying the description of the exemplary embodiments, the reaction-receiving part 615 will be called the tie-bar ears 615.

The technical effect of the arrangement of the platen 600 is that substantial suppression of deflection of the tie-bar ears 615 and substantial suppression of the peripheral portion 606 may be achieved responsive to an application of a force 679 to the tie-bar ears 615. This arrangement results in a potential reduction of damage to force-inducing components (such as item 667 and/or item 666) that act on the tie-bar ears 615.

Preferably, the platen 600 includes a mold-bearing zone 602 and also includes a force-bearing zone 610. The mold-bearing zone 602 has a central portion 604. The mold-bearing zone 602 also has a peripheral portion 606 that surrounds the central portion 604. The mold-bearing zone 602 also has an intermediate portion 608 that is positioned between the central portion 604 and the peripheral portion 606. The central portion 604 and the peripheral portion 606 are symmetrically coupled to the force-bearing zone 610, but the intermediate portion 608 is symmetrically decoupled from the force-bearing zone 610. The technical effect is that upon transmitting a force to the force-bearing zone 610, the intermediate portion 608 remains substantially free from receiving the force. This arrangement permits molds of larger footprints to be used with the platen 600 (in sharp contrast to the known platens 100, 200, 300, 400 and 500 which cannot handle molds having a larger footprint).

In general terms, the force-bearing zone 610 is cooperative with the central portion 604 and is also cooperative with the peripheral portion 606. The zone 610 is substantially symmetrically uncooperative with the intermediate portion 608 so that upon transmitting a force to the force-bearing zone 610, the intermediate portion 608 remains substantially free from receiving the force.

Preferably, a force-transferring structure 662 is used to couple the force-bearing zone 610 to the central portion 604. A plurality of struts 609 are used to symmetrically couple the force-bearing zone 610 to the peripheral portion 606. The force bearing zone 610 remains substantially symmetrically decoupled from the intermediate portion 608 (so that, in effect, a force applied to the force-bearing zone 610 is decoupled from the intermediate portion 608. Preferably, the struts 609 are decoupled from the force-transferring structure 662, and the force-bearing zone 610 is coupled to the peripheral portion 606 at a plurality of coupling positions (such as items 609), and the coupling positions are located symmetrically around the peripheral portion 606.

Figure 3B:
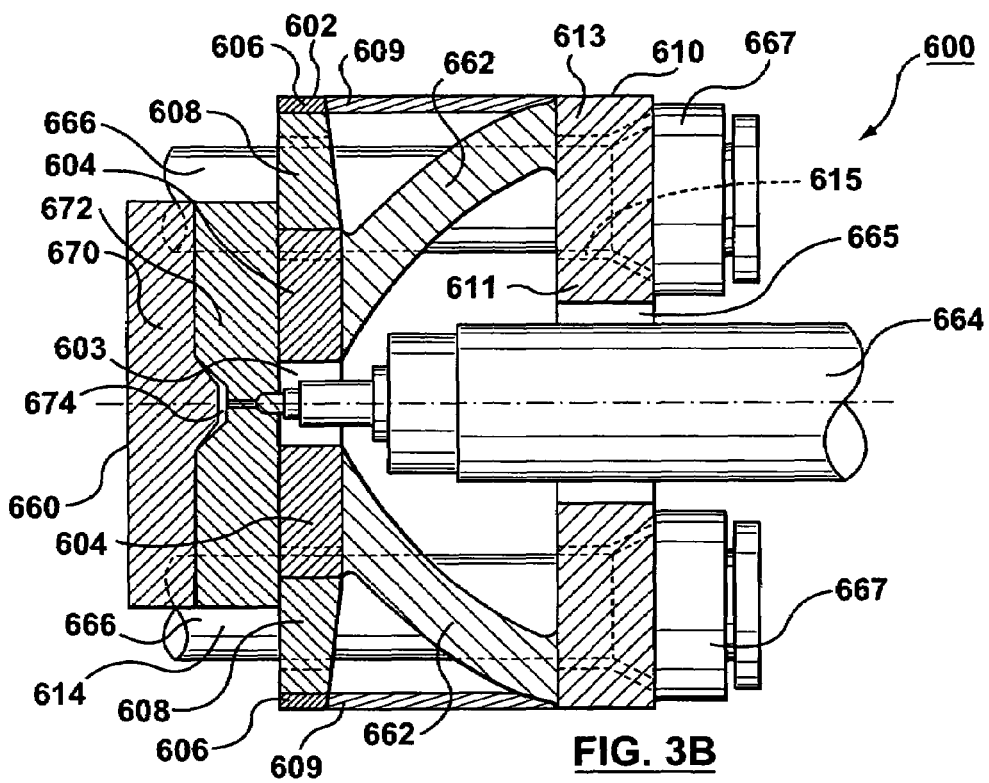

FIG. 3B is a cross-sectional view of the platen 600 along the line BB of FIG. 3A, in which a force has not yet been applied to the force-bearing zone 610. The mold-bearing zone 602 remains flat in this state of unapplied force.

Figure 1A:
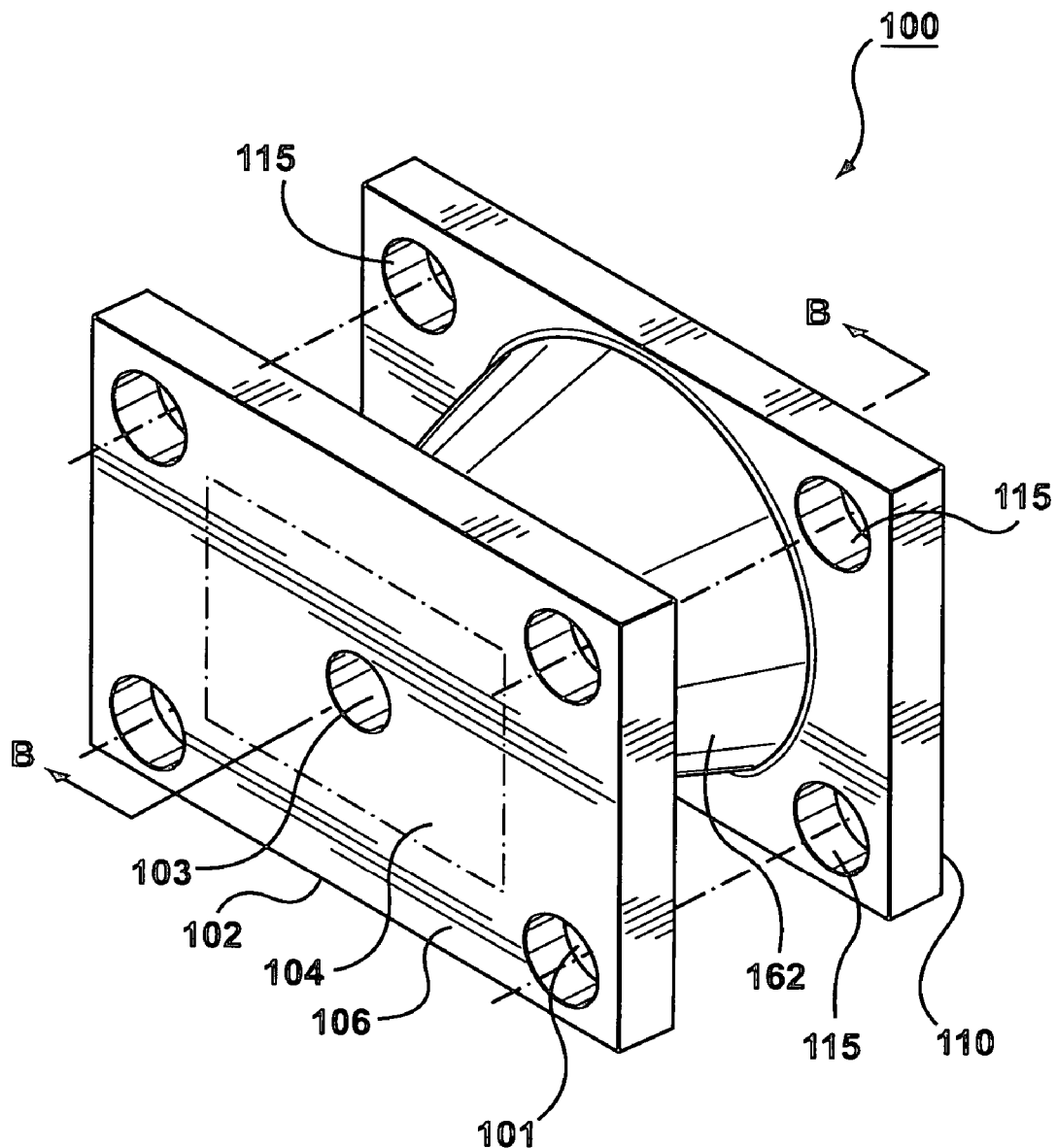
FIGS. 1A to 1D are views of known molding-system platens according to U.S. Pat. Nos. 5,593,711 and 5,776,402.
Figure 1B:
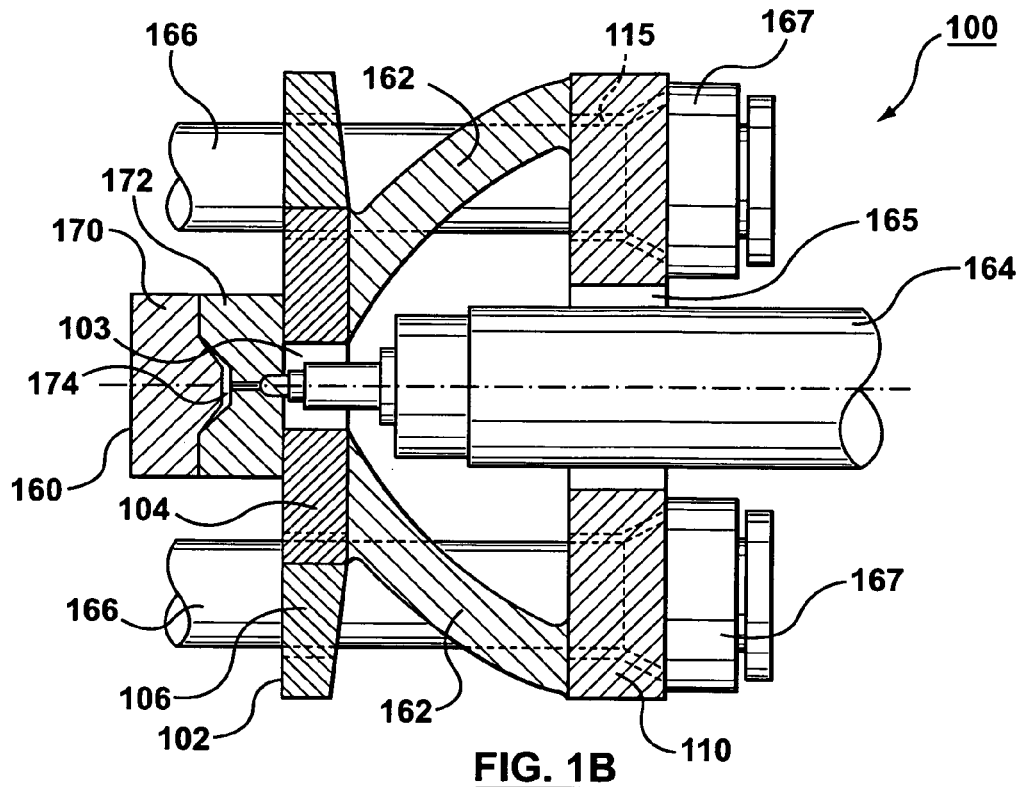
Figure 1C:
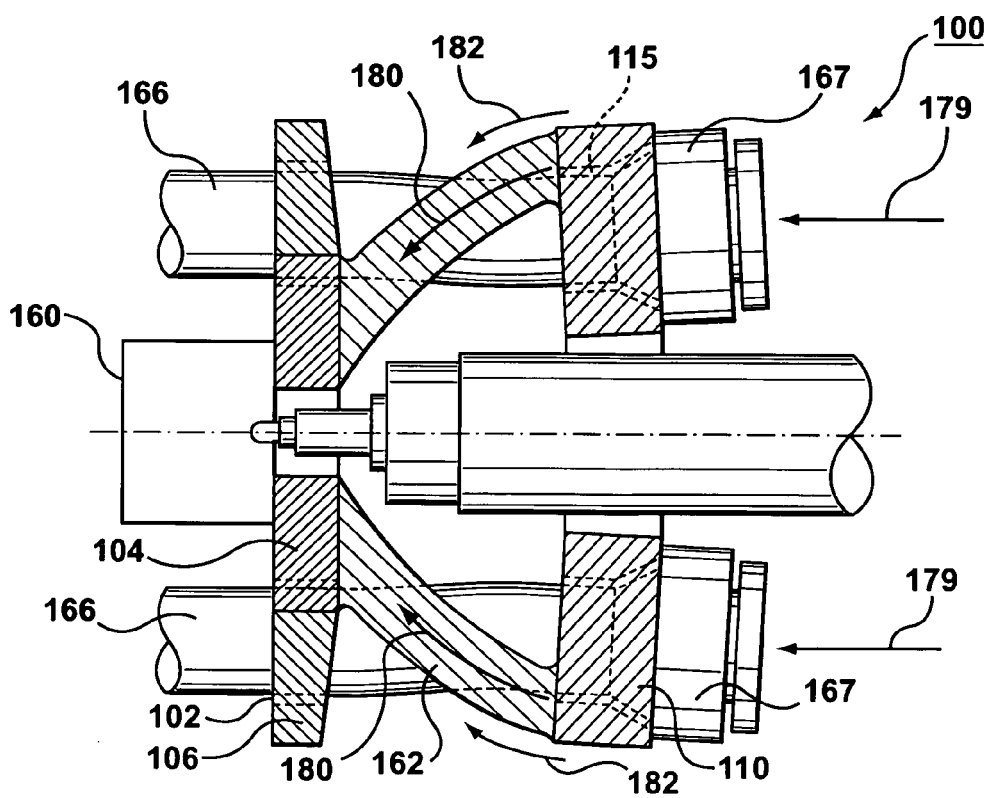
Figure 1D:
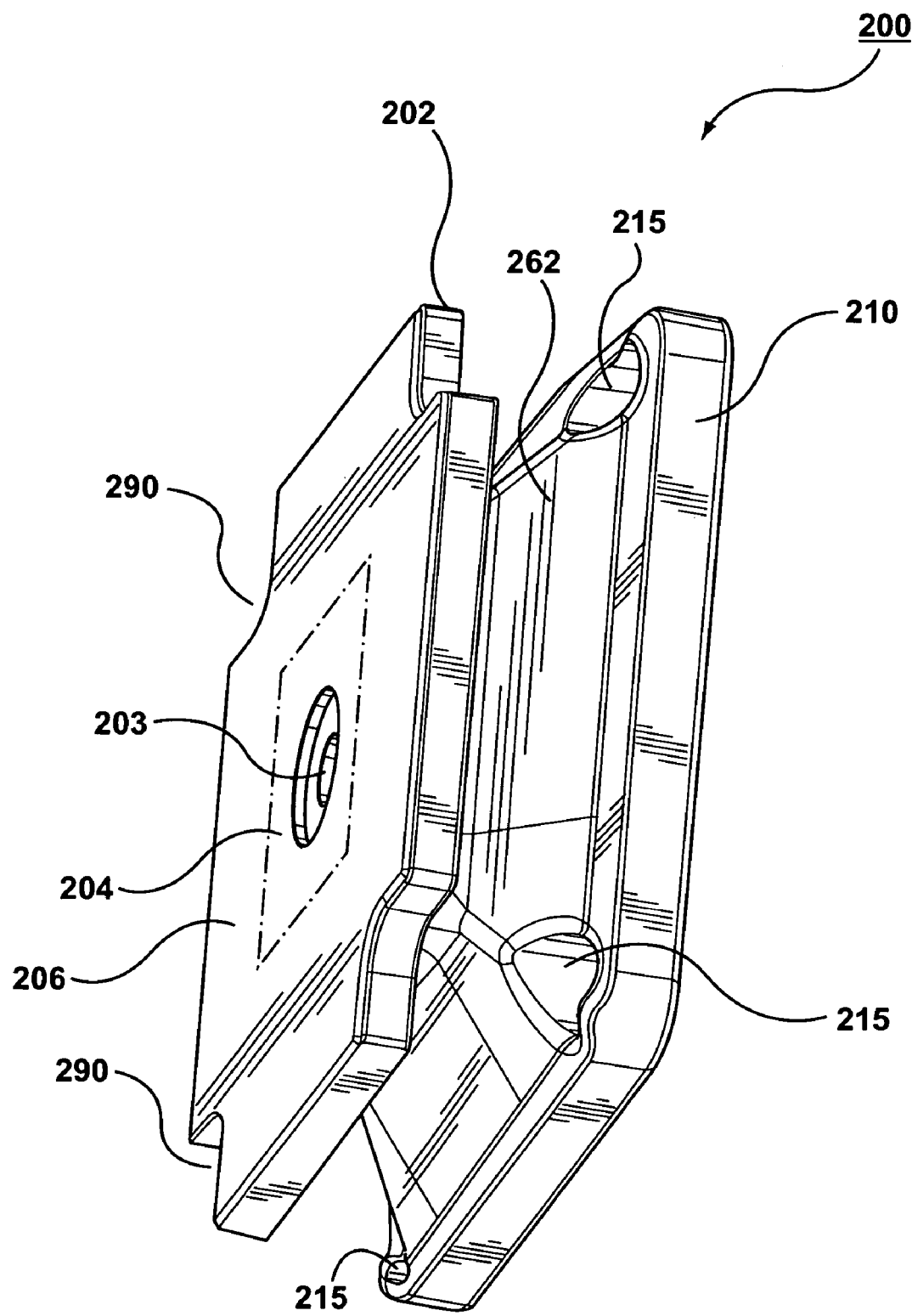
Figure 2A:
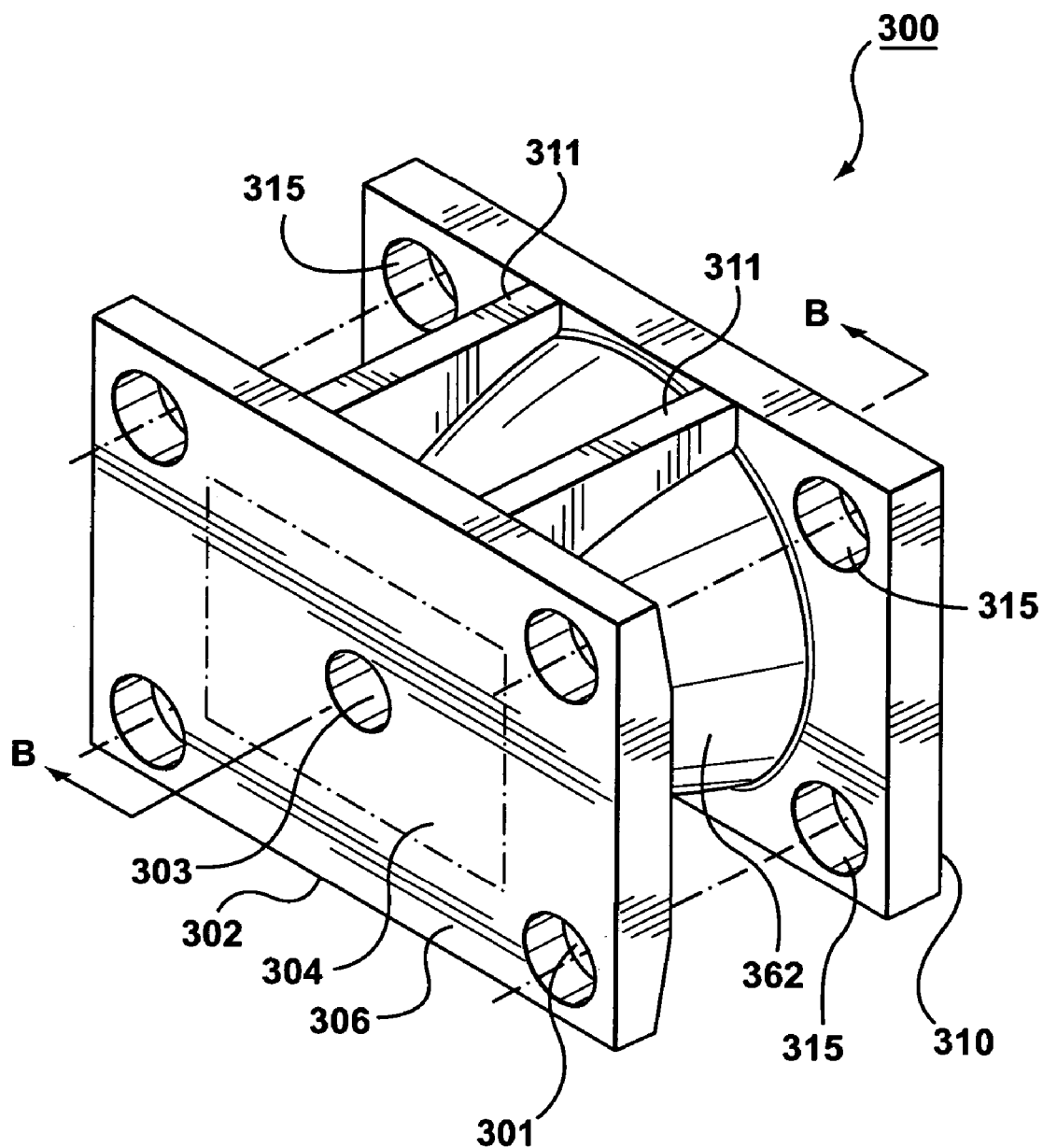
FIGS. 2A to 2D are views of known molding-system platens according to U.S. Patent Application Number 2004/0208950A1.
Figure 2B:
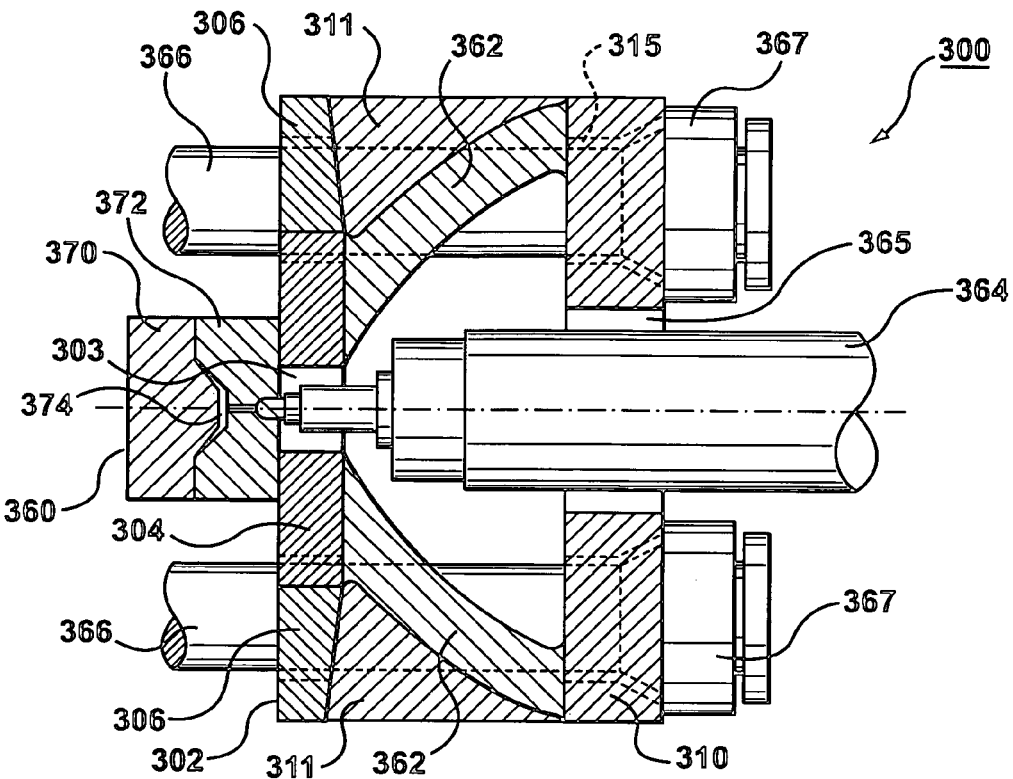
Figure 2C:
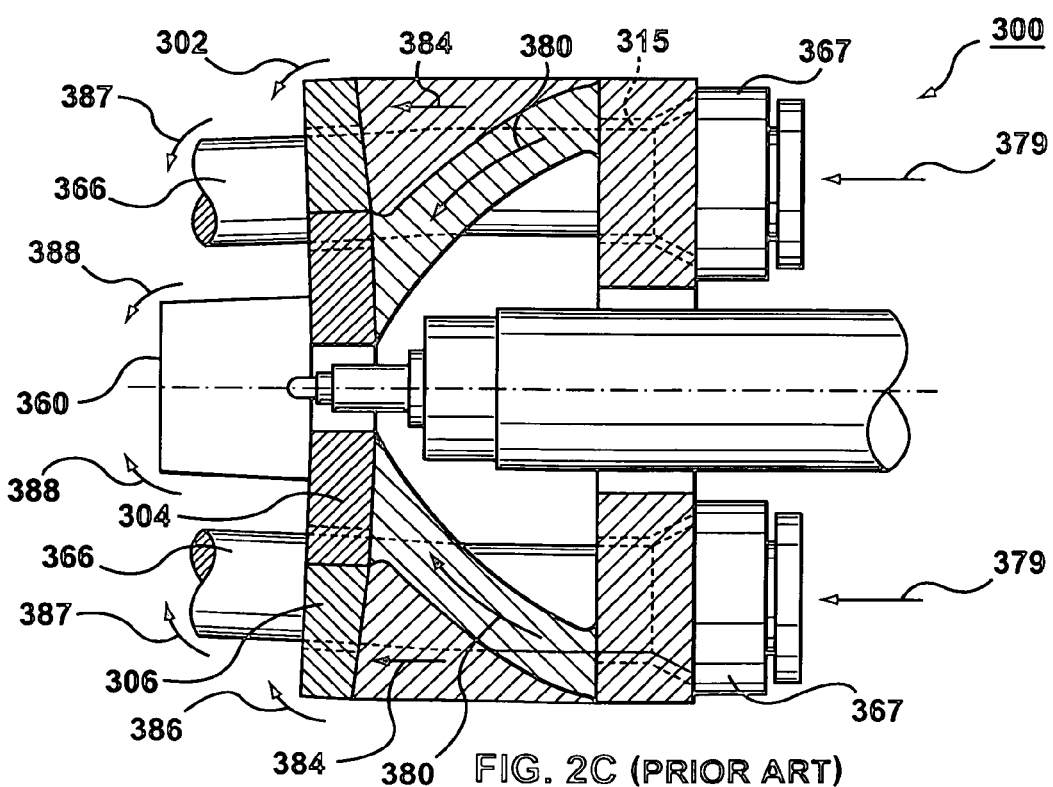
Figure 2D:
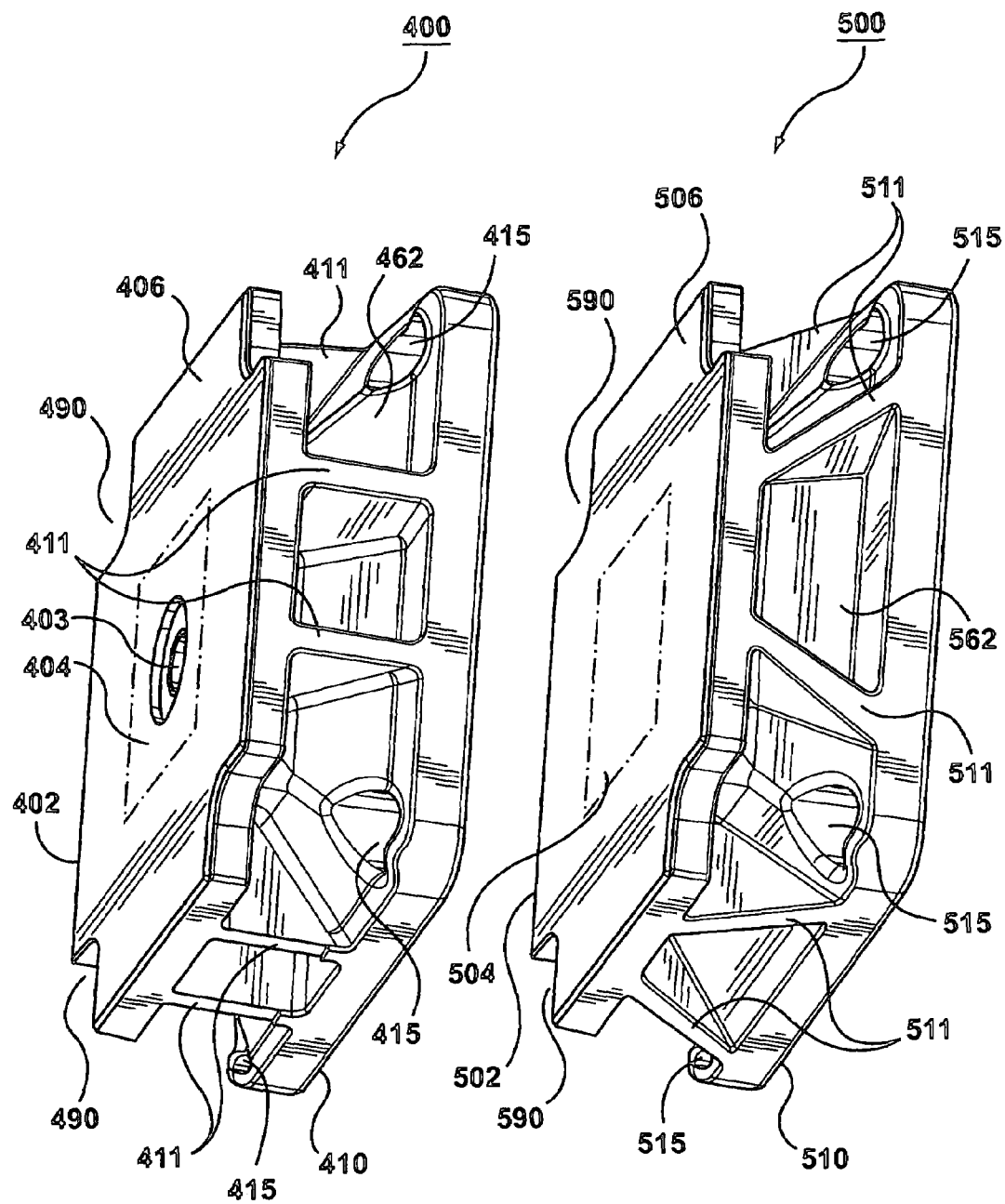
Figure 3C:
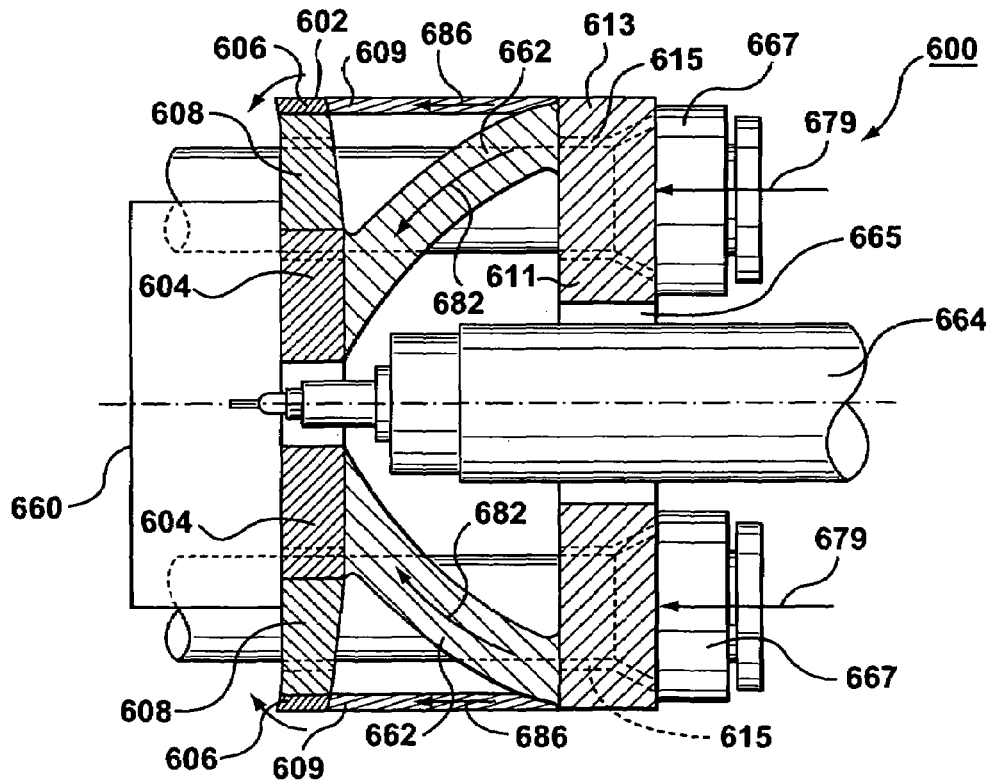

FIG. 3C is a cross-sectional view of the platen 600 along the line BB of FIG. 3A, in which a force 679 is depicted applied to the force-bearing zone 610, and as a result of the arrangement of the platen 600, the peripheral portion 606 is slightly warped and the intermediate portion 608 and the central portion 604 along with the peripheral corners of the force-bearing zone 610 are each insubstantially warped (preferably they remain unwarped). The force-transferring structure 662 transmits a portion 682 of the force 679 from the force-bearing zone 610 over to the central portion 604. The strut 609 transmits a smaller portion 686 of the force 679 over to the peripheral portion 606. The amount of the portion 686 of the force 679 is enough to cause an insignificant or slight warping of the peripheral portion 606 and of the peripheral corners of the force-bearing zone 610 so that (in effect) inadvertent wear to the tie bars 666 and the items 667 (a clamping mechanism or tie bar nuts) is substantially prevented. The intermediate portion 608 remains substantially un-warped (because the force 679 is substantially isolated from being transmitted to the intermediate portion 608) so that, in effect (amongst other things), the useful area (that is, the intermediate portion 608) may accommodate a mold that has a larger footprint in comparison the footprint of the mold 360 of FIG. 2C (the mold 360 is accommodated by the central portion 304 of the platen 300). The benefit of the platen 600 is to reduce warpage of the mold-bearing zone 602 and also avoiding warpage in the zone 610 proximate to the location where the tie bars 666 (or where the items 667) attach to or act with the zone 610. A technical effect is that a mold having a larger footprint can be accommodated by the platen 600 because the portions 604 and 608 remaining substantially flat when the force 679 is applied. (In sharp contrast, the known platens 300, 400, 500 cannot maintain flatness over a wider range of their mold-bearing zones.) Upon application of the force 679 to the force-bearing zone 610, the force-bearing zone 610 substantially symmetrically transmits a portion of the force 679 to the central portion 604 and to the peripheral portion 606, but the force 679 is substantially prevented from becoming transmitted to the intermediate portion 608.

According to a variant, the struts 609 extend from the zone 610 toward the zone 602 and they do not touch the zone 602 when no force is applied to the zone 610, but once a force is applied to the zone 610 then the struts 609 bend slightly and touch the zone 602. It will be appreciated that some struts 609 may connect the zones 602, 610 together while other struts 609 doe not. These are not ideal arrangements but they could be made to work and therefore they are considered within the scope of the exemplary embodiments.

Figure 3D:
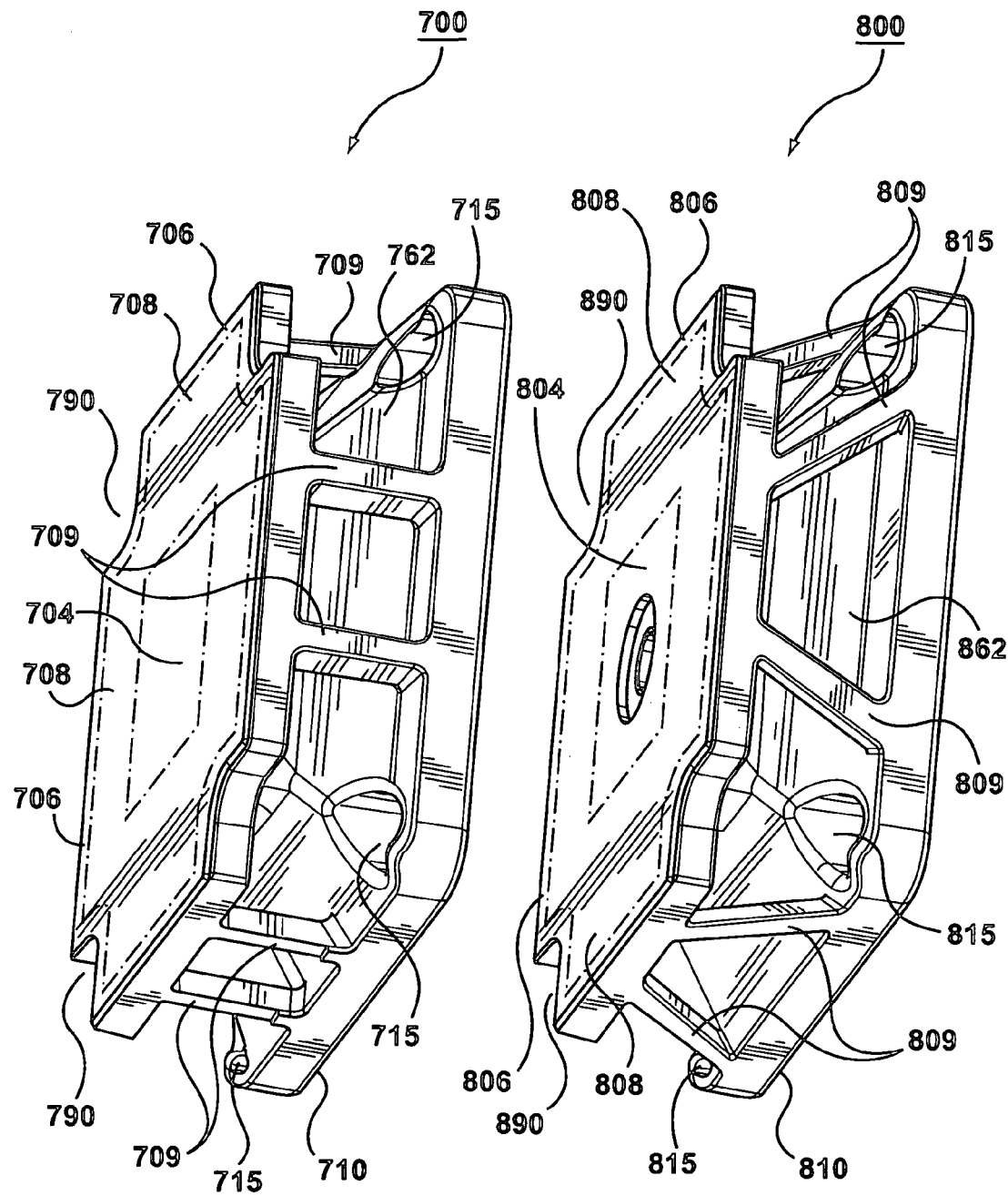

FIG. 3D is a perspective view of the molding-system platens 700, 800 (hereafter referred to as the "platens" 700, 800 respectively). To facilitate an understanding of the platens 700, 800, elements that are similar to those of the platen 600 are identified by reference numerals that use a seven-hundred designation and eight-hundred designation (respectively) rather than a six-hundred designation. For example, the mold-bearing zone of the platen 700 is labeled 702 rather than being labeled 602, while the mold-bearing zone of the platen 800 is labeled 802 rather than being labeled 602 (etc). The platens 700, 800 are depicted as a movable platen. The platens 700, 800 are similar to the platen 600.

The platen 700, 800 each include a mold-bearing zone 702, 802 (respectively) that have a central portion 704, 804 (respectively) that is surrounded by a peripheral portion 706, 806 (respectively). The platens 700, 800 each also include a force-bearing zone 710, 810 (respectively) that have a mid-section 711, 811 (respectively) that is surrounded by an edge 713, 813 (respectively) and that also have tie-bar ears 715, 815 that are positioned at corners of the force-bearing zone 710, 810 (respectively). The mid-section 711, 811 is linked to the center 704, 804. The edge 713, 813 is linked to and stiffens the peripheral portion 706, 806 (respectively). The peripheral portion 706, 806 is linked to and stiffens the tie-bar ears 715, 815 (respectively).

The mold-bearing zones 702, 802 no longer define tie bar passageways. The force-bearing zones 710, 810 define tie-bar ears 715, 815 respectively. The zones 702, 802 now define notches 790, 890 that surround tie bars at least in part. The struts 709, 809 are positioned symmetrically around the peripheral edge (portion) of the central portions 702, 802 respectively. The struts 709 are aligned perpendicularly between the zones 702 and 710 while the struts 809 are aligned non-perpendicularly between the zones 802 and 810. The force-transferring structures 762, 862 are shown as frustum-shaped bodies or as frusto-conical shaped bodies so that in effect the applied force may be symmetrically applied substantially across the corners of the central portions 704, 804.

Figure 3E:
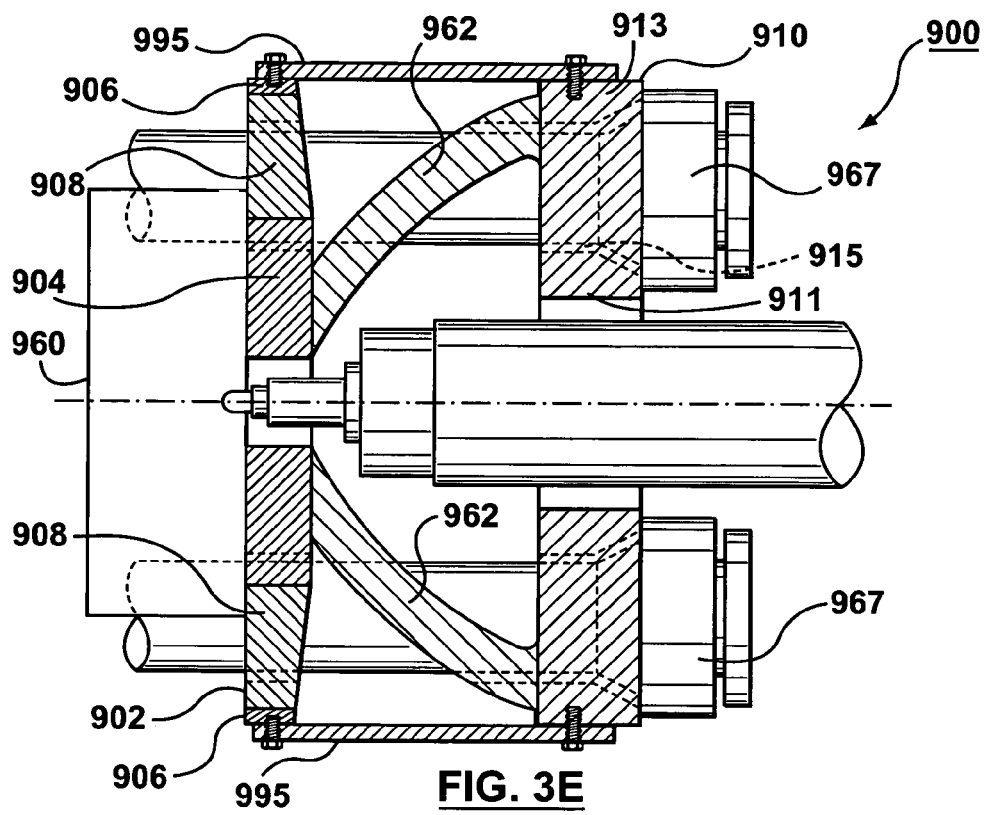

FIG. 3E is a cross-sectional view of the molding-system platen 900 (hereafter referred to as the "platen" 900). To facilitate an understanding of the platen 900, elements that are similar to those of the platen 600 are identified by reference numerals that use a nine-hundred designation rather than a six-hundred designation. For example, the mold-bearing zone of the platen 700 is labeled 902 rather than being labeled 602 (etc). The platen 900 is depicted as a movable platen. The platen 900 is similar to the platen 600.

A strut 995 is depicted as being mechanically fastened (for example, bolted, etc) to the mold-bearing zone 902 and to the force-bearing zone 910. An advantage of this approach is that the strut 995 increases the distance from the edge the mold 960 so that a mold having an even larger footprint may be placed on the zone 902. According to a variant of the platen 900 (not depicted), the strut 995 is welded to the mold-bearing zone 902 and to the force-bearing zone 910. According to another variant of the platen 900 (not depicted), the strut 995 extends from the front of zone 902 to the back of zone 910 and across the width of zones 902, 910 (that is, side to side), and in this sense the strut 995 becomes or forms a continuous web that extends from the zone 902 to the zone 910.

Figure 3F:
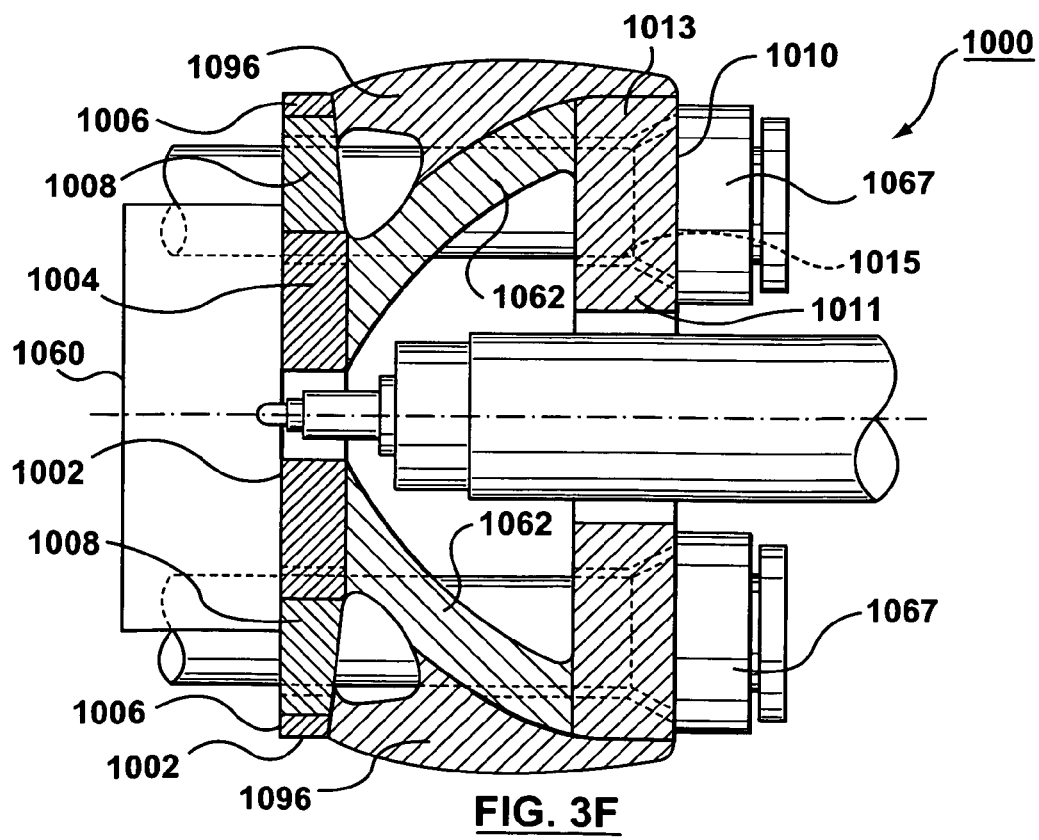

FIG. 3F is a cross-sectional view of the molding-system platen 1000 (hereafter referred to as the "platen" 1000). To facilitate an understanding of the platen 1000, elements that are similar to those of the platen 600 are identified by reference numerals that use a one-thousand designation rather than a six-hundred designation. For example, the mold-bearing zone of the platen 1000 is labeled 1002 rather than being labeled 602 (etc). The platen 1000 is depicted as a movable platen. The platen 1000 is similar to the platen 600.

A strut 1096 is integrally formed (or cast) to the mold-bearing zone 1002 and to the force-transferring structure 1062 but the strut 1096 does not couple the portion 1008 of the zone 1002 to the force-bearing zone 1010.

According to a variant of the platen 1000, the strut 1096 is integrally formed to the mold-bearing zone 1002, to the force-transferring structure 1062, and as well as to the force-bearing zone 1010 while still operating similarly to the other exemplary embodiments. However, it will be appreciated that while the strut 1096 is used to transmit a force from the force-bearing structure 1010 over to the peripheral portion 1006 of the mold-bearing zone 1002, the intermediate portion 1008 remains substantially decoupled from the force-bearing zone 1010.

The description of the exemplary embodiments provides examples of the present invention, and these examples do not limit the scope of the present invention. It is understood that the scope of the present invention is limited by the claims. The concepts described above may be adapted for specific conditions and/or functions, and may be further extended to a variety of other applications that are within the scope of the present invention. Having thus described the exemplary embodiments, it will be apparent that modifications and enhancements are possible without departing from the concepts as described. Therefore, what is to be protected by way of letters patent are limited only by the scope of the following claims:

What is claimed is:

1. A molding-system platen, comprising:
    a mold-bearing zone having a central zone surrounded by a peripheral portion; and
    a force-bearing zone having a mid-section surrounded by an edge, and also having a reaction-receiving part, the mid-section linking to the central zone, the edge linking to and stiffening the peripheral portion, and the peripheral portion linking to and stiffening the reaction-receiving part.

2. The molding-system platen of claim 1, wherein the reaction-receiving part includes tie-bar ears positioned at corners of the force-bearing zone.

3. The molding-system platen of claim 1, wherein the edge links to and stiffens the peripheral portion, and the peripheral portion links to and stiffens the reaction-receiving part sufficiently enough to substantially suppress deflection of the reaction-receiving part and also suppress deflection of the peripheral portion responsive to an application of a force to the reaction-receiving part.

4. The molding-system platen of claim 1, wherein the peripheral portion stiffens the reaction-receiving part sufficiently enough to substantially suppresses deflection of the reaction-receiving part once a force is applied to the reaction-receiving part.

5. The molding-system platen of claim 1, wherein the force-bearing zone is configured to receive a force from any one of a tie bar, a clamping mechanism any combination and permutation thereof.

6. The molding-system platen of claim 1, wherein the force-bearing zone is coupled to the peripheral portion at a plurality of coupling positions, the coupling positions are located symmetrically around the peripheral portion.

7. The molding-system platen of claim 1, further comprising a plurality of struts coupling the force-bearing zone to the peripheral portion, the plurality of struts are located symmetrically around the peripheral portion.

8. The molding-system platen of claim 1, wherein:
    the mold-bearing zone has an intermediate portion positioned between the central zone and the peripheral portion; and
    the force-bearing zone is substantially symmetrically decoupled with the intermediate portion, and responsive to transmission of a force to the force-bearing zone, the intermediate portion remains substantially free from directly receiving the force.

9. The molding-system platen of claim 8, wherein upon application of the force to the force-bearing zone, the force is substantially isolated from directly warping the intermediate portion so that a mold having a larger footprint may be accommodated by the intermediate portion.

10. The molding-system platen of claim 8, wherein upon the force-bearing zone receiving the force, the force-bearing zone conveys a minor portion of the force over to the peripheral portion, and the force-bearing zone is substantially prevented from conveying an amount of the force directly to the intermediate portion, and in response the peripheral portion becomes slightly warped while the intermediate portion and corners of the force-bearing zone remain substantially warp free.

11. The molding-system platen of claim 8, wherein the force-bearing zone is symmetrically decoupled from the intermediate portion.

12. A molding system, comprising:
a molding-system platen, including:
a mold-bearing zone having a central zone surrounded by a peripheral portion; and
a force-bearing zone having a mid-section surrounded by an edge, and also having a reaction-receiving part, the mid-section linking to the central zone, the edge linking to and stiffening the peripheral portion, and the peripheral portion linking to and stiffening the reaction-receiving part.

13. The molding-system platen of claim 12, wherein the reaction-receiving part includes tie-bar ears positioned at corners of the force-bearing zone.

14. The molding-system platen of claim 12, wherein the edge links to and stiffens the peripheral portion, and the peripheral portion links to and stiffens the reaction-receiving part sufficiently enough to substantially suppress deflection of the reaction-receiving part and also suppress deflection of the peripheral portion responsive to an application of a force to the reaction-receiving part.

15. The molding-system platen of claim 12, wherein the peripheral portion stiffens the reaction-receiving part sufficiently enough to substantially suppresses deflection of the reaction-receiving part once a force is applied to the reaction-receiving part.

16. The molding-system platen of claim 12, wherein the force-bearing zone is configured to receive a force from any one of a tie bar, a clamping mechanism any combination and permutation thereof.

17. The molding-system platen of claim 12, wherein the force-bearing zone is coupled to the peripheral portion at a plurality of coupling positions, the coupling positions are located symmetrically around the peripheral portion.

18. The molding-system platen of claim 12, further comprising a plurality of struts coupling the force-bearing zone to the peripheral portion, the plurality of struts are located symmetrically around the peripheral portion.

19. The molding-system platen of claim 12, wherein:
the mold-bearing zone has an intermediate portion positioned between the central zone and the peripheral portion; and
the force-bearing zone is substantially symmetrically decoupled with the intermediate portion, and responsive to transmission of a force to the force-bearing zone, the intermediate portion remains substantially free from directly receiving the force.

20. The molding-system platen of claim 19, wherein upon application of the force to the force-bearing zone, the force is substantially isolated from directly warping the intermediate portion so that a mold having a larger footprint may be accommodated by the intermediate portion.

21. The molding-system platen of claim 19, wherein upon the force-bearing zone receiving the force, the force-bearing zone conveys a minor portion of the force over to the peripheral portion, and the force-bearing zone is substantially prevented from conveying an amount of the force directly to the intermediate portion, and in response the peripheral portion becomes slightly warped while the intermediate portion and corners of the force-bearing zone remain substantially warp free.

22. The molding-system platen of claim 19, wherein the force-bearing zone is symmetrically decoupled from the intermediate portion.

23. A method, comprising:
linking a mid-section of a force-bearing zone to a central zone of a mold-bearing zone, the mold-bearing zone and the force-bearing zone included in a molding-system platen;
stiffening a peripheral portion surrounding the central zone by linking an edge surrounding the mid-section to the peripheral portion; and
stiffening a reaction-receiving part of the force-bearing zone by linking the peripheral portion to the reaction-receiving part.

24. The method of claim 23, further comprising:
including tie-bar ears positioned at corners of the force-bearing zone.

25. The method of claim 23, further comprising:
stiffening the peripheral portion by linking the edge to the peripheral portion; and
stiffening the reaction-receiving part by linking the peripheral portion to the reaction-receiving part sufficiently enough to substantially suppress deflection of the reaction-receiving part and also suppress deflection of the peripheral portion responsive to an application of a force to the reaction-receiving part.

26. The method of claim 23, wherein the peripheral portion stiffens the reaction-receiving part sufficiently enough to substantially suppresses deflection of the reaction-receiving part once a force is applied to the reaction-receiving part.

27. The method of claim 23, further comprising:
receiving a force to the force-bearing zone from any one of a tie bar, a clamping mechanism any combination and permutation thereof.

28. The method of claim 23, further comprising:
coupling the force-bearing zone to the peripheral portion at a plurality of coupling positions; and
locating the coupling positions symmetrically around the peripheral portion.

29. The method of claim 23, further comprising:
coupling a plurality of struts from the force-bearing zone to the peripheral portion; and
locating the plurality of struts symmetrically around the peripheral portion.

30. The method of claim 23, further comprising:
positioning an intermediate portion of the mold-bearing zone between the central zone and the peripheral portion; and
substantially symmetrically decoupling the force-bearing zone with the intermediate portion so that responsive to transmission of a force to the force-bearing zone, the intermediate portion remains substantially free from directly receiving the force.

31. The method of claim 30, further comprising:
substantially isolating the force, upon application of the force to the force-bearing zone, from directly warping the intermediate portion so that a mold having a larger footprint may be accommodated by the intermediate portion.

32. The method of claim 30, further comprising:
permitting the force-bearing zone, upon the force-bearing zone receiving the force, to convey a minor portion of the force over to the peripheral portion; and
substantially preventing the force-bearing zone from conveying an amount of the force directly to the intermediate portion, and in response the peripheral portion becomes slightly warped while the intermediate portion and corners of the force-bearing zone remain substantially warp free.

33. The method of claim 30, wherein the force-bearing zone is symmetrically decoupled from the intermediate portion.

* * * * *

UNITED STATES PATENT AND TRADEMARK OFFICE
CERTIFICATE OF CORRECTION

PATENT NO. : 7,318,721 B2  Page 1 of 1
APPLICATION NO. : 11/392794
DATED : January 15, 2008
INVENTOR(S) : Kevin Allan Spicer and Peter Adrian Looije It is certified that error appears in the above-identified patent and that said Letters Patent is hereby corrected as shown below:

In column 11:
　　line 17, claim 13 - cancel the text "The molding-system platen of claim 12" and insert the text --The molding system of claim 12--;
　　line 20, claim 14 - cancel the text "The molding-system platen of claim 12" and insert the text --The molding system of claim 12--;
　　line 27, claim 15 - cancel the text "The molding-system platen of claim 12" and insert the text --The molding system of claim 12--;
　　line 32, claim 16 - cancel the text "The molding-system platen of claim 12" and insert the text --The molding system of claim 12--;
　　line 36, claim 17 - cancel the text "The molding-system platen of claim 12" and insert the text --The molding system of claim 12--;
　　line 40, claim 18 - cancel the text "The molding-system platen of claim 12" and insert the text --The molding system of claim 12--;
　　line 45, claim 19 - cancel the text "The molding-system platen of claim 12" and insert the text --The molding system of claim 12--;
　　line 54, claim 20 - cancel the text "The molding-system platen of claim 12" and insert the text --The molding system of claim 12--;
　　line 59, claim 21 - cancel the text "The molding-system platen of claim 12" and insert the text --The molding system of claim 12--;

In column 12:
　　line 1, claim 22 - cancel the text "The molding-system platen of claim 12" and insert the text --The molding system of claim 12--;

Signed and Sealed this

Twenty-third Day of February, 2010

David J. Kappos
*Director of the United States Patent and Trademark Office*